United States Patent [19]
Fox et al.

[11] Patent Number: 5,842,532
[45] Date of Patent: Dec. 1, 1998

[54] PERSONAL TRANSPORT VEHICLE AND METHOD OF IMPROVING THE MANEUVERABILITY OF A VEHICLE

[75] Inventors: Bruce W. Fox; George A. Fox, both of Grand Rapids, Mich.

[73] Assignee: Fox American Inc., Grand Rapids, Mich.

[21] Appl. No.: 721,585

[22] Filed: Sep. 25, 1996

[51] Int. Cl.$^6$ ................................................. B62D 11/04
[52] U.S. Cl. ................... 180/6.48; 180/24.06; 180/24.08
[58] Field of Search .................... 180/22, 24.06, 180/24.07, 24.08, 24.11, 24.12, 6.2, 6.48, 6.5, 65.1, 65.6

[56] References Cited

U.S. PATENT DOCUMENTS

| | | | |
|---|---|---|---|
| 2,224,411 | 12/1940 | Smith | 180/29 |
| 2,592,023 | 4/1952 | Gleason | 180/9.1 |
| 3,180,305 | 4/1965 | Gower-Rempel | 115/1 |
| 3,198,551 | 8/1965 | Garner | 280/481 |
| 3,664,450 | 5/1972 | Udden et al. | 180/65 |
| 3,771,615 | 11/1973 | Rieli | 180/6.48 |
| 3,814,199 | 6/1974 | Jones | 180/6.5 |
| 4,009,761 | 3/1977 | Meyer | 180/6.2 |
| 4,056,158 | 11/1977 | Ross | 180/6.48 |
| 4,274,503 | 6/1981 | Mackintosh | 180/23 |
| 4,407,381 | 10/1983 | Oswald et al. | 180/6.48 |
| 4,562,893 | 1/1986 | Cunard | 180/6.5 |
| 4,664,208 | 5/1987 | Horiuchi et al. | 180/23 |
| 4,702,843 | 10/1987 | Oswald et al. | 180/24.07 |
| 4,730,684 | 3/1988 | Pedersen | 180/22 |
| 4,823,900 | 4/1989 | Farnam | 180/6.5 |
| 4,960,180 | 10/1990 | Livingston | 180/9.28 |
| 5,323,867 | 6/1994 | Griffin et al. | 180/22 |
| 5,409,250 | 4/1995 | Csotonyi | 280/304 |
| 5,429,543 | 7/1995 | Tilbor et al. | 446/456 |
| 5,445,233 | 8/1995 | Fernie et al. | 180/6.5 |

*Primary Examiner*—Kevin Hurley
*Attorney, Agent, or Firm*—Van Dyke, Gardner, Linn & Burkhart, LLP

[57] ABSTRACT

An all wheel drive personal transport vehicle is provided which can be used to transport persons over a wide range of terrains, while at the same time providing a vehicle that can be easily controlled and maneuvered. The vehicle includes a frame having a front end, a rear end, and first and second opposed sides. A first drive train is supported on the first side of the frame. A second drive train is supported on the second side of the frame. Each of the drive trains are adapted to be driven by a reversible motor and include front, middle, and rear wheels. Each of the wheels includes a pneumatic tires with a tire pressure. Preferably, the tire pressure of each of the middle wheels is greater than either of the tire pressures of the front and rear wheels so that the frame easily pivots about the tires on the middle wheels when the drive trains are driven in opposite directions or at different speeds. The increased tire pressure in the middle tires causes a greater proportion of the weight of the vehicle to be directed to the middle tires, thus minimizing the drag between the front and rear tires and the support surface. A method of improving the maneuverability of a six wheel drive vehicle is provided which includes the steps of providing a six wheel drive vehicle having a pair of front tires, middle tires, and rear tires and providing a pressure in each of the tires. The middle tires are provided with a pressure in the range of approximately two to four times greater than any of the tire pressures of the front and rear tires, such that the weight of the vehicle is distributed with greater proportion to the middle tires and the turning ability and general maneuvering ability is improved.

27 Claims, 5 Drawing Sheets

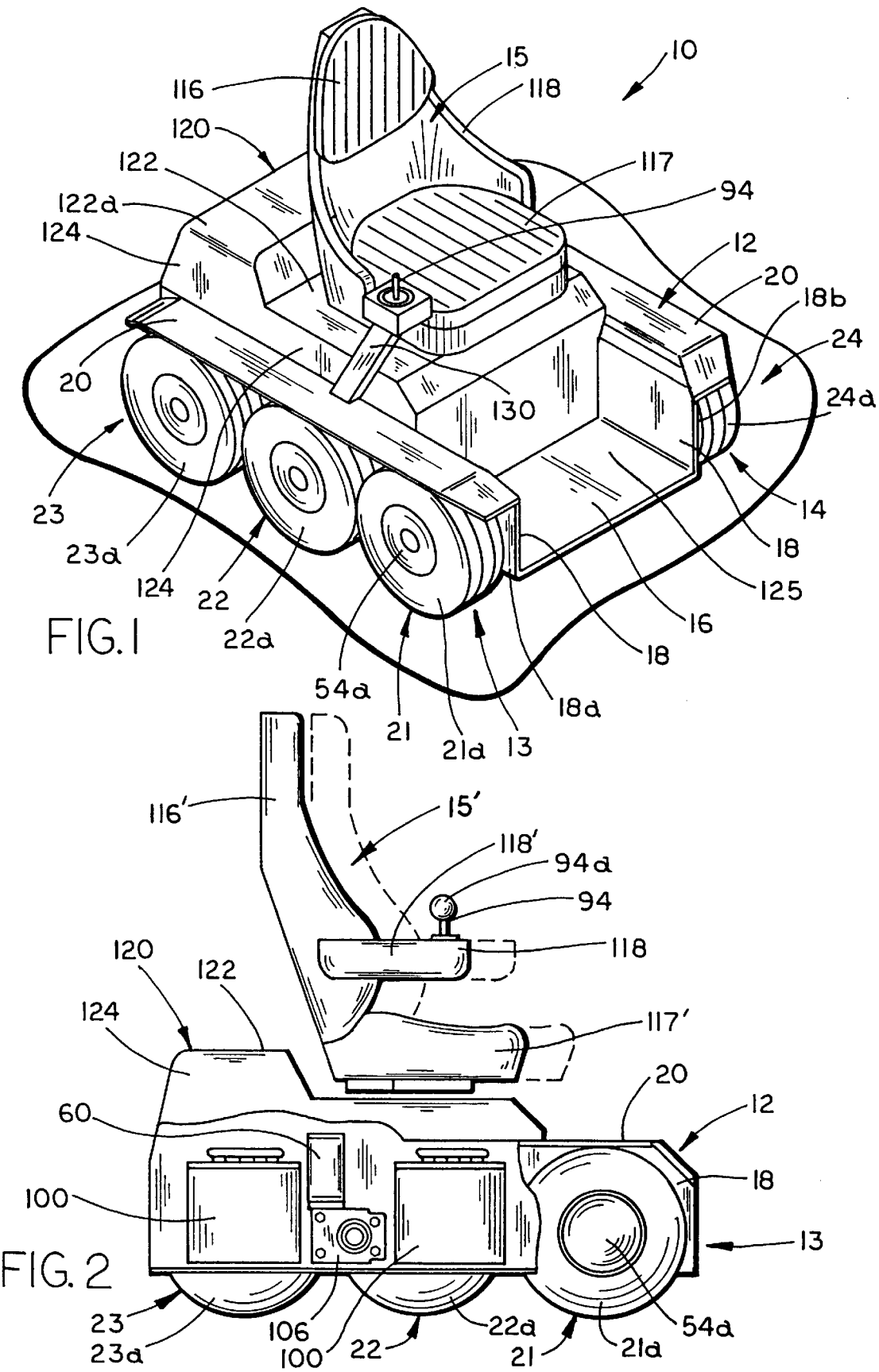

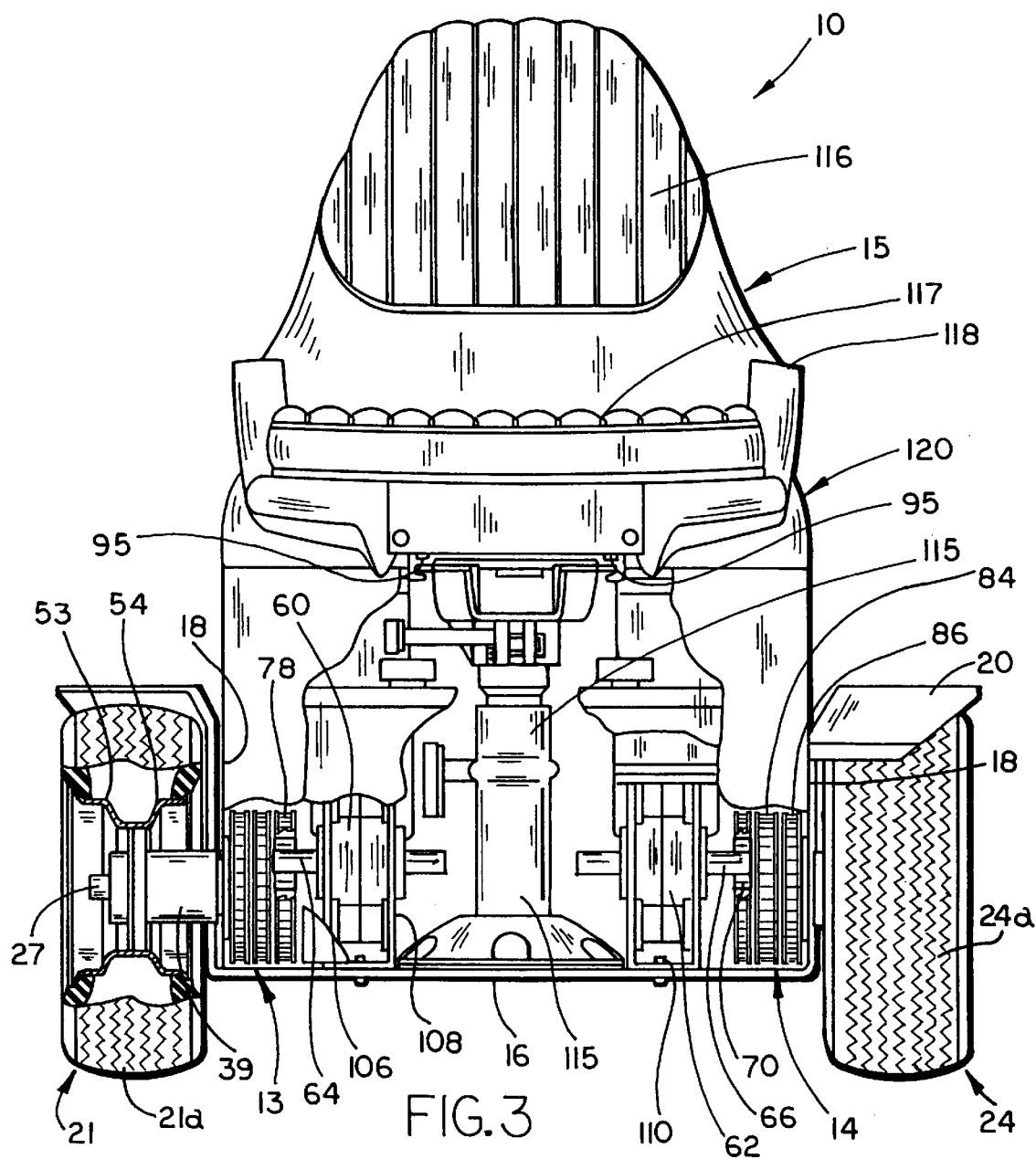
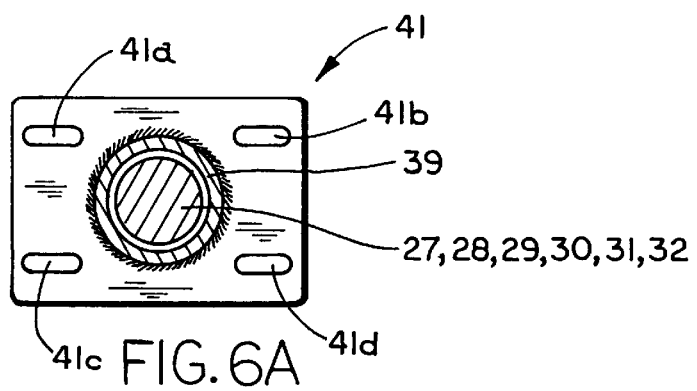

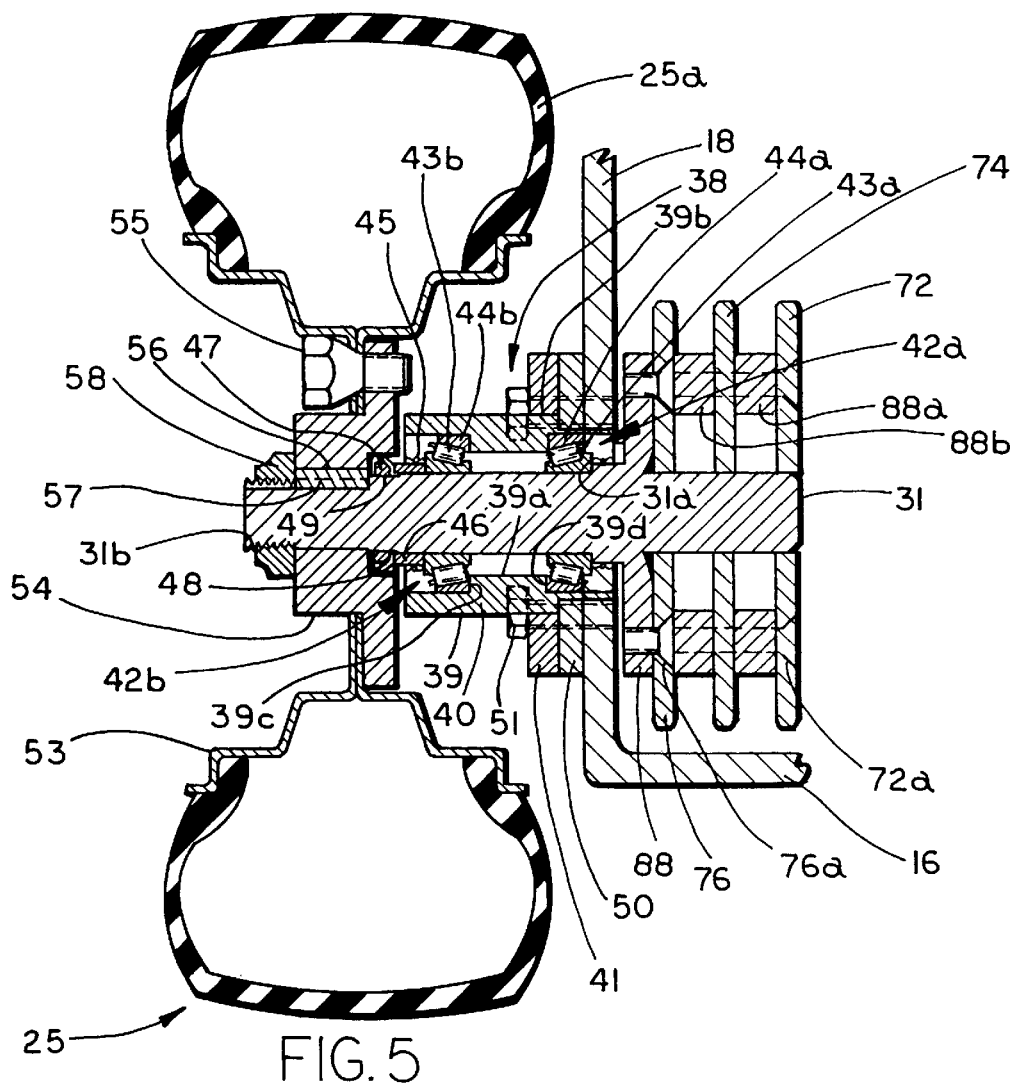
FIG. 5
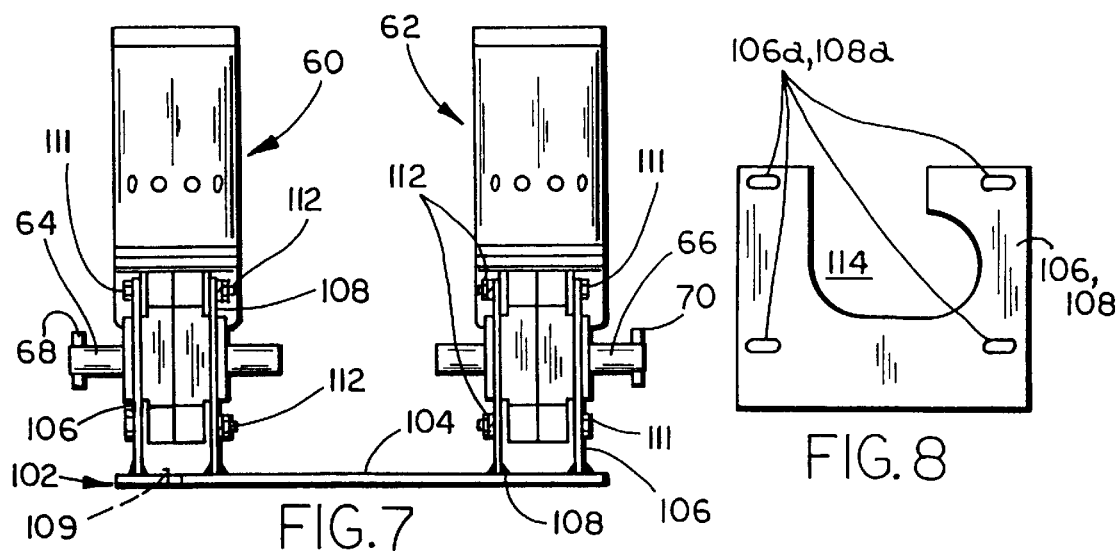
FIG. 7
FIG. 8

PERSONAL TRANSPORT VEHICLE AND METHOD OF IMPROVING THE MANEUVERABILITY OF A VEHICLE

FIELD OF THE INVENTION

The present invention relates to a six-wheel drive vehicle and, more particularly, to a six-wheel drive vehicle for transporting persons, including physically impaired persons, over a wide range of terrains.

BACKGROUND OF THE INVENTION

Conventional all wheel drive vehicles offer many advantages over rear or front wheel drive vehicles, such as greater traction and control over ice, water, and granular surfaces, but generally have a significantly larger turning radii because turning is hampered by the increased friction between the all wheel drive trains and the solid ground surfaces, such as road surfaces.

In six wheel drive vehicles, the lack of maneuverability is even more noticeable as the outer wheels tend to drag on the ground. Some six wheel drive vehicles have overcome this problem by lowering the center wheel's axle so that the drag from the outer wheels is reduced, such as disclosed in U.S. Pat. No. 4,009,761 to Meyer. However, these vehicles tend to exhibit an undesirable rocking motion when the vehicle's weight is shifted or when uneven terrain is encountered because the tires cannot simultaneously engage the ground.

Other vehicles have employed omnidirectional wheels for the outer most wheels. The omnidirectional wheels include a plurality of rollers on annular shafts that are mounted on a wheel hub, such as disclosed in U.S. Pat. No. 5,323,867 to Griffin et al. These vehicles are well suited for uniform surfaces such as concrete or asphalt but are generally not well suited for granular surfaces, such as cross-country terrain or sand, since the outermost wheels do generally not provide traction.

Furthermore, many of the wheelchair vehicles are not suited for physically challenged persons who are active in outdoor activities, such as bird watching, camping, hunting, and the like, and need vehicles that can transport them over all types of terrain while, at the same time, being adapted to transport them through doorways in a house or a building. Most conventional power driven wheelchairs are not well suited for cross-country terrain. Some power driven wheelchairs have employed endless track drives to overcome these limitations, such as disclosed in U.S. Pat. No. 4,960,180 to Livingston. However, these endless track trains tend to damage the terrain.

Consequently, there is a need for a personal transport vehicle that can provide an all-wheel drive train while at the same time providing a vehicle that can be maneuvered easily over most terrains. In addition, there is a need for a personal transport vehicle that can transport physically impaired persons over a wide range of terrain and yet still be used to transport physically impaired persons through doorways and passageways and the like in a house or building.

SUMMARY OF THE INVENTION

Accordingly, the present invention provides an improved personal transport vehicle especially suited for physically impaired persons who require assistance with transportation and who desire greater maneuverability over a wide range of terrains. The improved personal transport vehicle includes a drive train that enables the person being transported to have greater control of the vehicle's speed and direction.

According to one aspect of the invention, the vehicle includes a frame and two drive trains adapted to be driven by motors, with one drive train supported on one side of the frame and the other drive train supported on the other side of the frame. Each drive train includes front, middle, and rear wheels. Each wheel includes a pressurized tire. The tire pressures of the tires of the middle wheels are greater than the tire pressures of the tires of the front and rear wheels, such that when the drive trains are driven in opposite directions or at different speeds, the vehicle easily pivots about the middle tires.

In other aspects of this invention, the wheels of the drive trains are mounted on driven axles which extend from the sides of the frame. The axles are preferably aligned in a common plane so that the tires simultaneously engage a support surface.

In further aspects, the vehicle includes a control system having a control handle and a drive assembly in communication with the handle and adapted to convert positions of the handle into first and second voltages and to apply the voltages to the motors. The control handle may comprise a joy-stick. The joy-stick provides finger tip control of the vehicle's speed and direction and preferably communicates with the motors through the drive assembly. The joy stick is preferably mounted near or on the seat to provide easy access for the person on the vehicle.

In addition, the vehicle frame supports at least one battery to power the drive system. Preferably, the frame supports a two 12-volt or four 6-volt rechargeable batteries.

In yet another aspect of the invention, the vehicle includes a frame adapted to support a physically impaired person. Two sets of axles are mounted to the sides of the frame, each set of axles including a front, a middle, and a rear axle, with all the axles aligned in a common plane. Each axle includes a pneumatic tire having substantially the same diameter as the tires of the other axles so that the tires are aligned to simultaneously engage the ground. The axles are driven by reversible motors with drive shafts, which are respectively coupled to the middle axles on each side of the frame. The middle axle on each side of the frame is respectively coupled to the axle of the front wheel and to an axle of the rear wheel on the respective side of the frame, thus forming a six-wheel drive vehicle.

According to one aspect of this invention, the tire pressures of the middle tires are greater than the tire pressures of the front and rear tires on each side so that the front and rear tires develop less friction with the ground than the middle tires, thus permitting the vehicle to pivot about the middle wheels.

According to yet another aspect of the invention, a method of improving the maneuverability of a six wheel drive vehicle includes the step of providing a six wheel drive vehicle having a pair of front tires, a pair of middle tires, and a pair of rear tires. The method further includes providing each of the front tires, each of the rear tires, and each of the middle tires with a pressure. The middle tires have a pressure in the range of approximately two to four times greater than any of the tire pressures of the front and rear tires, which distributes the weight of the vehicle with greater proportion to the middle tires and, consequently, reduces the friction between the front and rear tires and the support surface to improve the turning ability and general maneuverability of the vehicle.

As will be understood, the six wheel drive vehicle of the present invention provides numerous advantages over prior known six wheel drive vehicles. The vehicle's wheels are mounted on axles, which are aligned in a common plane so that the tires of the wheels simultaneously engage the ground. With reduced pressures on the front and rear tires, the weight of the vehicle and the passenger is directed to the middle tires so that the front and rear tires develop less friction with the ground when the vehicle is turning, but still provide stability to the vehicle. Consequently, the vehicle provides greater control over speed and direction without sacrificing the vehicle's ability to be navigated over a wide range of terrain.

Additionally, a smaller turning radius is achieved with the improved drive train since there is less resistance to turning from the outer most tires. Furthermore, the vehicle is stable and does not exhibit the rocking motion that is associated with some of the prior art vehicles. Moreover, the vehicle incorporates a control handle and control system that is responsive to slight changes in the position of the control handle. As a result, the vehicle can be controlled with very little effort, which is especially suitable for physically challenged persons.

BRIEF DESCRIPTION OF THE DRAWINGS

FIG. 1 is a perspective view of a personal transport vehicle of the present invention;

FIG. 2 is a side elevational view of the personal transport vehicle shown in FIG. 1 illustrating a second embodiment of the seat;

FIG. 3 is a front elevational view of the personal transport vehicle of FIG. 1 with portions broken away showing the details of the wheels, axles, and drive trains;

FIG. 5 is a cross sectional view taken along V—V of FIG. 4 illustrating amounting assembly and showing a more detailed view of one wheel with its associated axle and sprockets;

FIG. 6A is an elevational view of a mounting plate for the mounting assembly;

FIG. 7 is a front elevational view of the drive support structure;

FIG. 8 is a side elevational view of the drive support structure of FIG. 6 illustrating the details of a motor mount upright.

DETAILED DESCRIPTION OF THE PREFERRED EMBODIMENTS

Figure 4:
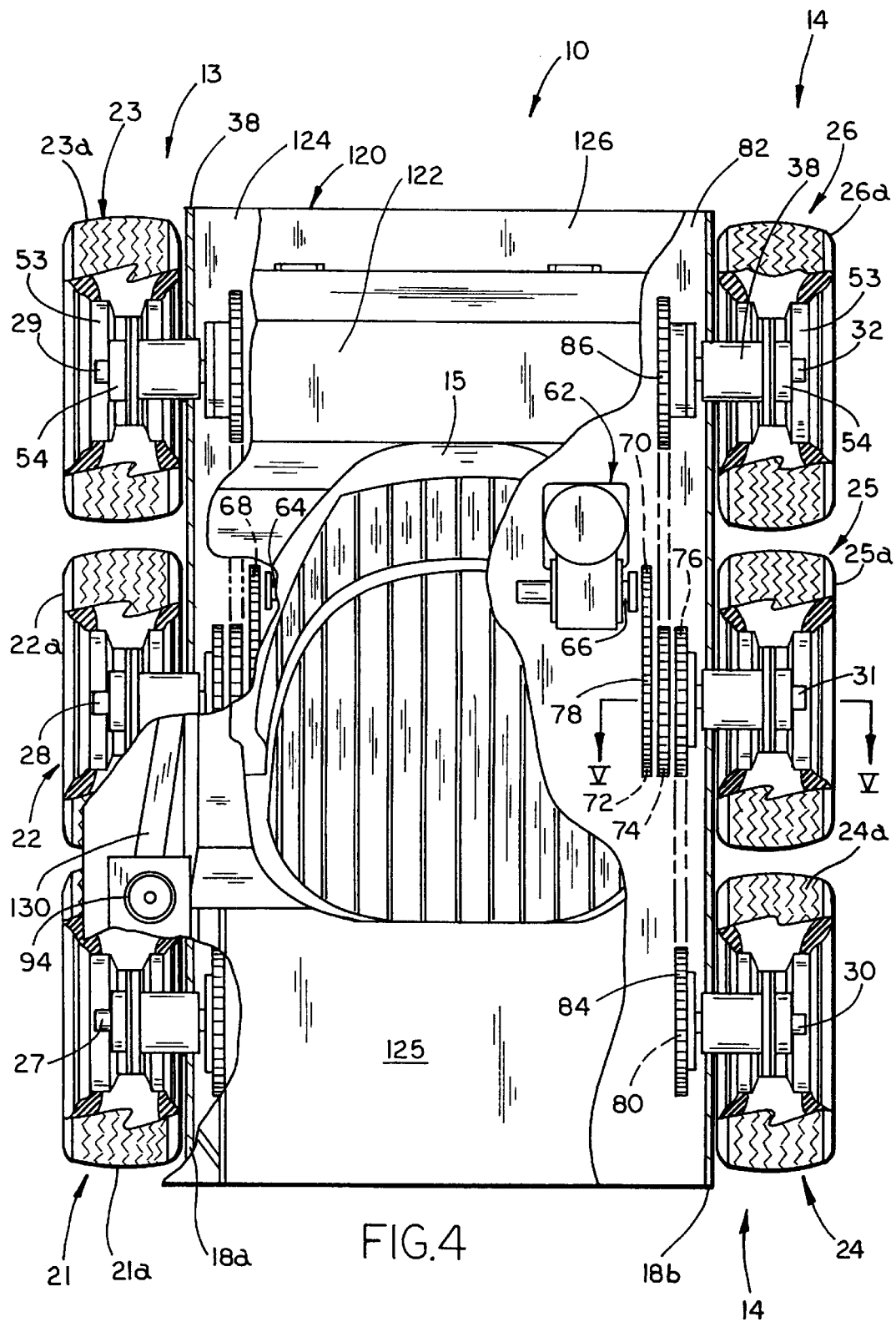
FIG. 4 is a plan view of the personal transport vehicle with portions broken away to show the wheels, axles and the sprockets.

Referring to FIG. 1, the numeral 10 generally designates a personal transport vehicle for transporting persons illustrating the present invention. Personal transport vehicle 10 is especially suited for transporting physically impaired persons or seniors who may be less able to move on their own. Personal transport vehicle 10 includes a frame 12, first and second drive trains 13 and 14, and a seat 15, which is mounted to frame 12 by welding or fasteners or the like. As best seen in FIGS. 1 and 3, frame 12 is a generally channel shaped metal frame having a horizontal web portion 16 and two spaced apart vertical flange portions 18. Preferably, web 16 of frame 12 lies in a horizontal plane below the drive trains to lower the center gravity of vehicle 10 and, therefore, provide a vehicle that can make relatively sharp turns without tipping over. Flange portions 18 include horizontal fenders 20, which extend outwardly from flange portions 18 and over drive trains 13, 14 to thereby provide a wheel well for drive trains 13 and 14. Fenders 20 serve several functions. First, fenders 20 provide protection to the passenger by placing a barrier between the passenger and the drive trains so that hands or feet cannot accidentally slip into the drive trains and to protect the passenger from rocks, mud, and other debris that may be splattered from the drive trains as they drive over the varying terrains on which this transport vehicle may be used. Moreover, fenders 20 are structural members in that they provide a support surface and provide stiffness to flange portions 18 from which the drive trains 13 and 14 are supported.

Drive trains 13 and 14 each include a set of wheels that are mounted to flange portions 18 on respective axles (FIGS. 4 and 5). Each set of wheels includes a front wheel 21 or 24, a middle/center wheel 22 or 25, and a rear wheel 23 or 26. Front, middle and rear wheels 21, 22, and 23 are mounted on axles 27, 28, and 29, respectively, which extend from a first side 18a of frame 12. Front, middle, and rear wheels 24, 25, and 26 are similarly mounted on axles 30, 31, and 32, which extend from second side 18b of frame 12.

Axles 27, 28, 29, 30, 31, 32 are rotatably mounted on and journaled in flange portions 18 by mounting assemblies 38 and are aligned in a common plane and in-line with one another so that wheels 21–26 are supported about coplanar axes of rotation. As best seen in FIGS. 5, mounting assembly 38 includes a tubular member 39 having a cylindrical wall 40 defining inner and outer surfaces 39a and 39b and a mounting flange 41, which is welded or otherwise secured to tubular member 39. As best seen in FIG. 6A, mounting flange 41 includes a plurality of bolt holes 41a, 41b, 41c and 41d for receiving mounting bolts, which secure mounting assemblies 38 to the respective flange portions 18 through a rail plate 50, as will be explained more fully below.

Axles 27–32 are journaled in tubular members 39 on first and second bearing assemblies 42a and 42b. To simplify the description of the mounting assembly 38, reference will be made to center wheel 25 and center axle 31, as the mounting details for the wheels onto the axles and for the axles onto the mounting assemblies are the generally same. Other differences exist, however, with regard to the tire pressures and the sprocket arrangements, as will be more fully discussed later. Tubular member 39 supports a medial portion of the axle 31 on first and second bearing assemblies 42a and 42b, which rest on an inner surface 39a of tubular member 39. Inner surface 39a includes first and second spaced apart annular shoulders 39c and 39d, which abut bearing assemblies 42a and 42b for axially restraining axle 31 within tubular member 39. Bearing assemblies 42a and 42b each include a roller bearing cup 43a, 43b and a roller bearing cone 44a, 44b. A first roller bearing cup 43a is mounted on axle 31 between a shoulder 31a, which is provided on axle 31, and shoulder 39d of tubular member 39. A first roller bearing cone 44a is similarly mounted on the axle 31, overlaying the first roller bearing cup 43a and abutting shoulder 39d of tubular member 39. Similarly, a second roller bearing cup 43b is mounted on axle 31 adjacent shoulder 39c, with a second roller bearing cone 44b overlaying the bearing cup 43b and abutting shoulder 39c of tubular member 39. A seal 45 and spacer 46 are then mounted on a threaded portion 49 of axle 31 adjacent the second bearing assembly 42b to prevent debris from entering into the bearing assemblies and to retain packing grease or other lubricants, which are conventionally used on wheel bearing assemblies. To secure the axle 31 and its bearing assemblies 42a and 42b in the tubular member 39, a nut 47 and washer 48 are mounted on threaded portion 49 of the axle 31. It should be understood from the foregoing description, that mounting assembly 38 permits axle 31 to rotate but restricts the vertical, lateral, and horizontal movement of axle 31. Consequently, axle 31 is free to move in one direction only, in other words, has only one degree of freedom—to rotate about its longitudinal axis.

Figure 6B:
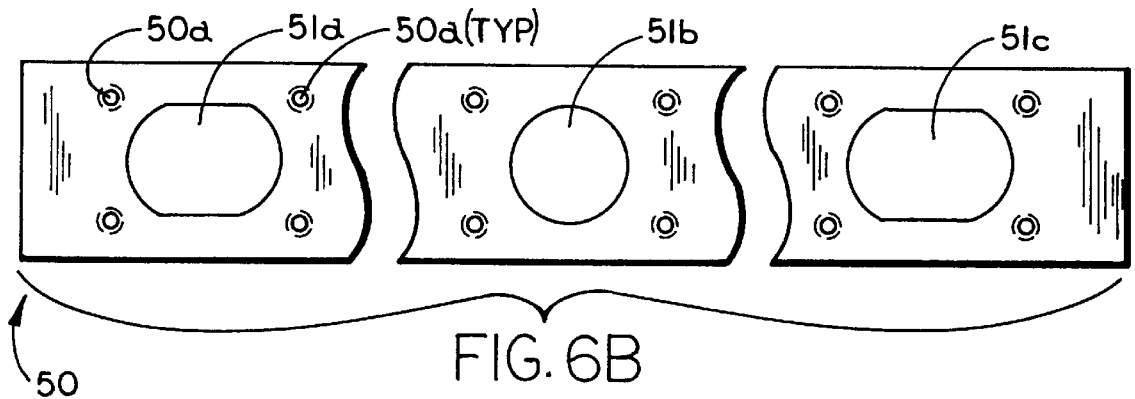
FIG. 6B is an elevational view of a rail member.

Tubular member 39 is secured to flange portion 18 of frame 12 by mounting flange 41, which is welded or otherwise secured around outer surface 39b of tubular member 39. Mounting plate 41 overlays a rail plate 50, which extends along flange portion 18, and is mounted to flange portion 18 by mounting bolts 51, which extend through bolts openings 50a provided in rail plate 50 (FIG. 6B). As described previously mounting flange 41 includes a plurality of bolt holes 41a, 41b, 41c, and 41d for receiving mounting bolts 51. Preferably, bolt holes 41a, 41b, 41c, and 41d are slotted to ease installation of mounting assemblies 38 onto frame 12. Rail plate 50 includes spaced apart axle openings 51a, 51b, and 51c for receiving the respective axles of wheels 21–26. Preferably first and second axle holes 51a and 51c are slotted for the front and rear axles 27, 30, and 29, 32 so that the front and rear axles on both sides of the frame may be adjusted to take up any slack in the chains that coupled the respective axles together, which will be described in more detail later.

With reference to FIG. 5, center wheel 25, which includes a wheel rim 53, is mounted on axle 31 by a hub 54. Wheel rim 53 is preferably bolted to hub 54 by at least three lug bolts 55 (only one is shown). Hub 54 mounts on the distal end portion of axle 31 and includes a key way 56 which aligns with a respective key 57 provided on axle 31 to rotatably fix the hub 54 and wheel 25 to axle 31. Hub 54 is axially secured on the respective axle by a nut 58 that mounts onto a threaded distal end portion 31b of axle 31. A hub cap 54a may be provided to cover the nut 58 and distal end of the respective axle (FIGS. 1 and 2). As mentioned earlier, these details with, respect to the mounting of each wheel on its respective axle is typical for all the wheels and, therefore, reference is made only to center/middle wheel 25 and center/middle axle 31. Preferably, each wheel has the same diameter as the other wheels.

Wheels 21–26 each include a pressurized, preferably pneumatic tire 21a, 22a, 23a, 24a, 25a and 26a. Tires 21a, 22a, 23a, 24a, 25a and 26a are preferably the same size in diameter, namely, 14.6 inches by 6 inches. Consequently, all size tires simultaneously engage the ground since they are each rotationally mounted about axes of rotation that are substantially coplanar. While the wheels engage the ground simultaneously, the tires engage the ground with different normal loads and, therefore, develop different friction forces, as will be more fully explained. Tires 22a and 25a, mounted on middle axles 22 and 25, are preferably inflated with air to a tire pressure that is in the range of approximately 2 to 4 times the tire pressures of the tires 21a, 23a, 24a, 26a on the front wheels and the rear wheels. Most preferably, tires 22a and 25a are inflated to a tire pressure of approximately three times the tire pressures of the tires 21a, 23a, 24a, 26a on the front wheels and the rear wheels. By inflating the middle tires 22a and 25a to a greater pressure than the tires on the front and rear wheels, the middle tires 22a and 25a have a greater stiffness than tires 21a, 23a, 24a, and 26a. Therefore, the method of inflating the middle tires to a pressure that is greater than the pressures of any of the front and rear tires, distributes the weight of the vehicle and its contents with greater proportion to the middle axles 28 and 31. As a result, the middle tires 22a and 25a support a greater percentage of the weight of the vehicle and its contents than the front and rear tires 21a, 23a, 24a, and 26a. Consequently, the friction between the tires on the front and rear wheels and the ground surface is much less than the friction between tires 22a and 25a on the middle wheel and the ground surface to improve the maneuverability of the vehicle 10. In operation, vehicle 10 turns by pivoting on middle wheels 22 and 25 and the drag created by fiction forces between the front and rear tires and the ground surface during turning is considerably diminished. Furthermore, as all six tires simultaneously engage the ground, the vehicle is stable over uneven terrain. In this manner, the control of the vehicle is greatly improved. The weight distribution may be further enhanced by positioning the rider to be centered over the middle tires, as, will be more fully described in reference to seat 15.

As shown in FIGS. 2, 3, 4, 7 and 9, axles 27–32 are driven by first and second motors 60 and 62. Motors 60, 62 are preferably bi-directional reversible, permanent-magnet, gear-reduced DC electric motors that are powered through a control system 65, which will be discussed in detail below. Most preferably, each motor 60, 62 is a combined motor and gear box assembly available from Electric Motor Development Ltd, Halstead, Essex, England, as type PM63/50-24 volt-GB2 25:1. Each motor/gear box combination 60, 62 operates at 24 volts, 485 watts, at 200 rpm and is ventilated with a large internal fan. Drive shafts 64, 66 on each motor each include a drive sprocket 68, 70 for driving center wheels 22 and 25, respectively. For clarity, further reference is made with respect to second drive train 14 and second motor 62 only, but it should be understood that the same details apply to the first drive train 13 and first motor 60. Center axle 31 includes three spaced apart sprockets 72, 74, and 76. Outermost sprocket 72 is drivingly coupled to drive sprocket 70 of second motor 62 by a continuous chain 78 which extends around drive sprocket 70 and outermost sprocket 72. Middle and innermost sprockets 74 and 76 are provided on center axle 31 for drivingly coupling the center axle 31 to front and rear axles 30, 32, respectively. Forward and rearward axles 30, 32 similarly include sprockets 80, 82 which are coupled to middle and innermost sprockets 74, 76, respectively, by continuous chains 84, 86.

As best seen in FIG. 5, in order to secure the sprockets 72, 74, 76 to axle 31, innermost sprocket 76 is preferably fastened by a bolt or screw to a sprocket mounting flange 88, which is either an integral flange formed on a proximate end portion of axle 31 or may be fixed to the end portion of axle 31 by welding. Middle and outermost sprockets 74 and 72 are then fastened to sprocket 76 by bolts or screws that extend from the outer most sprocket, 72, through a spacer 88a, middle sprocket 74, a second spacer 88b, and into innermost sprocket 76. Preferably, the screw or bolt holes 72a and 76a on sprockets 72 and 76 are countersunk so that the fasteners' heads are flush with the surfaces of the sprockets. Spacers 88a and 88b are provided to assure that sufficient space is maintained between sprockets 72, 74, 76 to provide clearance for chains 78, 84, and 86, which are mounted on the adjacent sprockets to transfer torque from the motor's drive shaft 66 to center axle 31 and from center axle 31 to front axle 30 and from center axle 31 to rear axle 32. Sprockets 80, 82 are similarly mounted on their respective axles 30, 32 by sprocket mounting flanges.

As previously described, rail 50 includes elongated openings 51a and 51c to provide clearance for each of the front and rear axles 30 and 32. This clearance permits axles 30 and 32 to be moved and fixed in an adjusted position via their respective mounting assemblies longitudinally along flange portions 18 so that any slack in chains 84 and 86 may be taken up.

Motors 60 and 62 are powered by batteries 100 through a control system 65, which will be more fully described. In operation, when a positive voltage drop is applied to first motor's terminals, first motor's drive shaft 64 rotates in a clockwise direction. Drive sprocket 68 on drive shaft 64 drives outermost sprocket 72 on center axle 28 in a clockwise direction to induce wheel 22 to rotate in a clockwise direction. As axle 28 rotates in a clockwise direction, sprockets 74 and 76 also rotate in a clockwise direction so that all the wheels 21, 22, and 23 on first drive train 13 are rotating in the same forward direction. If second motor and gear box assembly 62 is similarly driven, wheels 24, 25, and 26 on second drive train 14 will also be rotating in the same forward direction, thus vehicle 10 will move forward in a generally straight direction.

On the other hand, if a negative voltage drop is applied to first reversible motor and gear box assembly 60, the drive shaft 64 will rotate in a counter-clockwise direction and the wheels 21, 22, and 23 of first drive train 13 will be rotating in a counter-clockwise, backward direction. If motor and gear box assembly 62 is similarly powered, then wheels 24, 25, and 26 of the second drive train will also rotate in a counter-clockwise direction, causing vehicle 10 to move in a generally straight but reverse direction. If on the other hand, a positive voltage is applied to motor and gear box assembly 62 while a negative voltage drop is applied to motor/gear box 60, then second drive train 14 will be rotating in the opposite direction from first drive train 13, causing vehicle 10 to spin about center wheels 22 and 25 in a counter-clockwise direction as viewed from above in FIG. 4. The speed of the motors can be reduced by reducing the applied voltages. If one motor is stopped while the other motor is still running, the vehicle will rotate rather than spin. If both motors are operating in the same direction, but with different speeds, then the vehicle will turn, with the turning radius being a function of their differential speed.

It should also be understood that by having two direct drive trains, the motors provide a dynamic braking system. When motor and gear box assemblies 60 and 62 stop, wheels 21–26 similarly stop.

Figure 9:
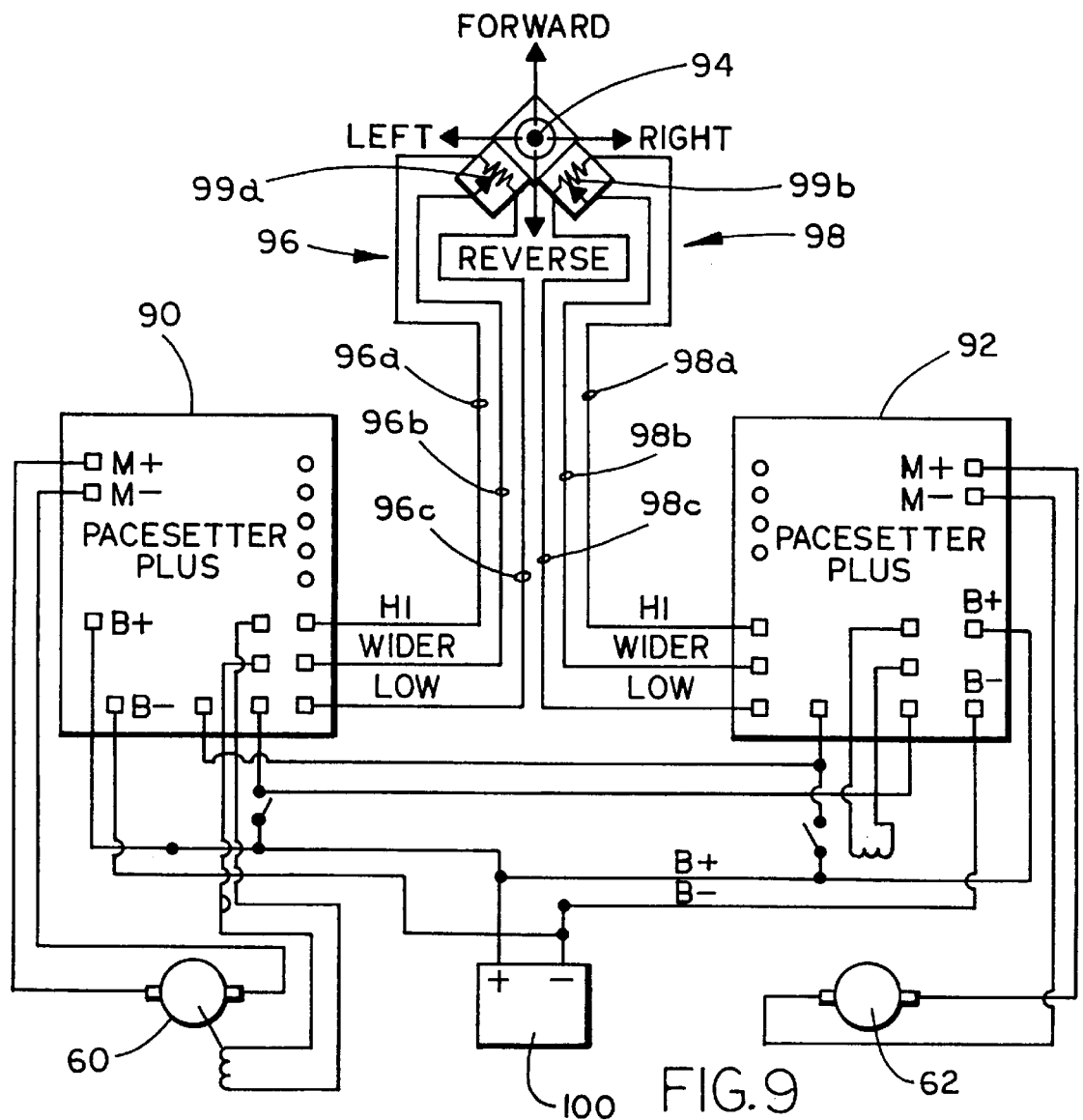
FIG. 9 is a schematic view of the control system.

As described above, motor and gear box assemblies 60, 62 are selectively driven by control system 65 (FIG. 9). Control system 65 includes conventional, electronic, variable speed, DC drive boards 90 and 92 including electric control circuits that are available from IPC Automation of Riverdale, N.J. under the trademark PACESETTER PLUS™. Boards 90, 92 preferably operate on 24 volts DC input voltage as do motors 60, 62. Drive boards 90, 92 are powered by batteries 100 and control the flow of electricity from batteries 100 to motor and gear box assemblies 60, 62. Drive boards 90, 92 receive control signals from a joy stick control handle 94 that is provided and mounted on frame 12 for easy access to the passenger. Joy stick 94 is preferably a dual-axis, resistive type joy stick, which requires only light pressure of approximately 0.14 pounds to change the position of the joy stick to one of a plurality of positions. Joy stick 94 is conventional in operation and available from CH Products, Vista, Calif. under Model 100 and uses potentiometers to vary the voltage applied to the motors through boards 90, 92. As best seen in FIG. 9, joy stick 94 includes two sets of leads 96, 98, each set of leads connecting to one of the respective drive boards 90, 92. Referring to the connections on drive board 90, a first lead 96a is coupled to the "HI" connection, a second lead 96b is coupled to the "WIDER" connection, and a third lead 96c is coupled to the "LOW" connection. As seen in FIG. 9, these connections are typical for both drive boards.

Joy stick 94 is mounted in a semi-spherical base in which it can assume a plurality of positions. Each position varies the resistance across resistors 99a, 99b and, consequently, varies the signal to the respective drive boards 90, 92. In referring to the various positions, reference is made to a clock so that its position can be more accurately described. A forward twelve o'clock position of the joy stick corresponds to both motor and gear assemblies 60, 62 fully powered with their drive shafts rotating in the clockwise direction (direction of drive shafts' rotation is described using FIG. 2 as the reference) inducing maximum forward speed in the vehicle 10. As the joy stick 94 is pulled back from the twelve o'clock position toward the center of the base, the applied voltages to the motor and gear box assemblies 60 and 62 are reduced simultaneously thus reducing the speed of the motors and, consequently, the forward speed of the vehicle 10. If the joy stick 94 is pulled all the way to the center, the most upright position for the joy stick 94, both motors 60, 62 stop, thus stopping the vehicle 10. If the joy stick 94 is further pulled so that it moves toward the six o'clock position of the base, then a negative voltage is applied to both motor and gear box assemblies 60 and 62 and the drive shafts of both motors rotate in the counter clockwise direction, causing the vehicle to move in a straight-line, reverse direction. As the joy stick 94 is moved toward the nine o'clock position, second motor's drive shaft slows down causing vehicle to turn to the left. When joy stick 94 is fully pushed to the nine o'clock position, motor and gear box assembly 62 will be running in a reverse direction, causing vehicle 10 to spin about center wheels 22 and 25. If a slow forward left turn is preferred, the joy stick 94 should be pushed to a position between the center, neutral position and the eleven o'clock position so that both motor and gear box assemblies will be running in the forward direction, but motor and gear box assembly 62 will be running at a slower speed than motor and gear box assembly 60. These and various other positions of the joy stick 94 determine the speed and direction of the vehicle 10.

Preferably, control system 65 is powered by four (4), 6-volt, rechargeable batteries 100, connected in series to provide 24 volts. Alternately, control system 65 can be powered by two 12-volt batteries, which also are connected in series to provide 24 volts. The smaller size batteries are easier to handle and can be advantageously placed on the frame to center the weight on frame 12. Batteries 100 are preferably positioned to distribute the weight over the central rearward portion of the vehicle frame 12. Likewise, motor and gear box assemblies 60, 62 are also supported in web 16 of frame 12 on a drive support structure 102.

Referring to FIGS. 3, 7, and 8, drive support structure 102 includes a horizontal web 104 and two pairs of vertically extending motor mount uprights 106 and 108. Web 104 includes a plurality of bolt holes 109 which receive bolts 110 that extend through holes (not shown) provided in web 16 of frame 12 to anchor drive support structure 102 to frame 12. Uprights 106 and 108 straddle motor and gear box assemblies 60, 62 and extend upwardly from web 104. Motor and gear box assemblies 60, 62 are mounted between the uprights 106, 108 by bolts 111 that extend through mounting bolt holes 106a and 108a and are secured thereto by nuts 112. Uprights 106, 108 further include central openings 114 that provide clearance for outwardly extending drive shafts 64, 66 of the motor and gear box assemblies 60, 62.

As described previously, frame 12 is generally channel shaped with horizontal web 16 and spaced apart flange portions 18. As best seen in FIG. 3, seat 15 is supported on web 16 at a position generally centered with respect to axles 28, 31 and wheels/tires 22, 25 by a downwardly extending post 115. Post 115 is bolted, or otherwise secured, to web 16 on one end and releasably secured to the base of seat 15 by bolts 95 on its other end. Seat 15 preferably includes a back rest 116 and seat bottom 117 with opposed side arm rests 118. Preferably, a seat belt or harness (not shown) is provided for added safety. It should be understood by those having ordinary skill in the art, that the shape and design of the seat shown in the drawings is for illustrative purposes only and that seat 15 may be modified for the individual needs of the person being transported and that numerous accessories may be added to the seat or the vehicle frame to enhance the use of the vehicle 10, such as a tray, fishing pole holder, gun rack, and compartment for holding personal articles, such as golf clubs, ski equipment, bicycles, and the like.

As best seen in FIGS. 1 and 4, vehicle 10 also includes a cover structure 120. Cover structure 120 is preferably made from a strong but light weight material, such as fiber glass, or a resinous, plastic material. Cover 120 includes a top member 122, which extends over motor and gear box assemblies 60, 62 and batteries 100, and two side members 124, which extend downwardly to the web 16 of frame 12. Top member 122 may include a support surface 122a, which is provided to carry articles, such as groceries, luggage, tool boxes, boxes, and the like. Cover 120 extends under the seat 15 but preferably terminates at or near the forward edge of the front seat so that vehicle 10 includes a foot rest surface 125. Cover 120 may also include a hinge door 126 to provide access to the batteries 100 and the motor and gear box assemblies 60 and 62 (FIG. 4). Cover structure 120 serves as several functions. It protects the batteries 100 and motor and gear box assemblies 60, 62 from the elements. Moreover, as cover 120 extends over the sprockets and continuous chains of the drive trains 13 and 14, it also protects them from debris that may be kicked up by the wheels. It is also contemplated that vehicle may be used over wet terrain or even in shallow water. In this case, a single prefabricated cover structure 120 may be preferred. Moreover, a water tight cover structure 120 may be preferred.

In yet another embodiment, vehicle 10 may also include a towing hitch (not shown) so that vehicle 10 may be used to haul equipment, boats, trailers, and the like.

In operation, a person who is seated on vehicle 10 controls joystick 94 to determine the direction of motion. Joystick 94 is preferably supported from the fenders 20 and is supported by a tubular member 130 that extends vertically up from the fenders 20 to arm rest level so that the person seated in personal transport vehicle 10 need not reach to adjust the speed or direction of the vehicle 10.

Alternatively, joy stick 94 is supported by an arm rest. As best seen in FIG. 2, seat 15' includes an armrest 118' that extends horizontally from back rest 116' and is spaced apart from seat bottom 117'. In this embodiment, joy stick 94 is mounted to a top surface of arm rest 118' and, furthermore includes a ball top 94a mounted to its distal end to provide a larger surface area to hold or push.

While the preferred embodiment is described in terms of transporting a physically challenged person over a wide range of terrain, it should be understood that vehicle 10 may be used to transport other and fully ambulatory persons or to haul items or to tow items, such as equipment, boats, trailers, and the like. Further, the invention may assembled with or without a cover structure 120.

It is to be understood that the foregoing is a description of the preferred embodiments. One skilled in the art will recognize that variations, modifications, and improvements may be made without departing from the spirit of the invention disclosed herein. The scope of the protection afforded is to be measured by the claims which follow and the breadth of interpretation which the law allows.

The embodiments of the invention in which an exclusive property or privilege we claim are defined as follows:

1. A personal transport vehicle comprising:
   a frame having a front end, a rear end, and first and second opposed sides;
   a first drive train supported on said first side of said frame;
   a second drive train supported on said second side of said frame; and
   each of said drive trains adapted to be driven by a reversible motor and including front, middle, and rear wheels, each of said wheels being rotatably mounted and having a pressurized tire with a tire pressure, said tire pressure of each of said tires on said middle wheels being greater than either of said tire pressures of said front and rear wheels so that said frame pivots about said tires on said middle wheels when said drive trains are driven in opposite directions or at different speeds.

2. A personal transport vehicle according to claim 1, wherein each of said wheels are mounted on driven axles extending from and rotatably supported by said first and second sides of said frame.

3. A personal transport vehicle according to claim 2, wherein each of said axles are adapted to be driven about an axis of rotation and said axles are aligned in a common plane, whereby all of said tires are aligned for simultaneously engaging a support surface.

4. A personal transport vehicle according to claim 2, further comprising:
   a control system including:
      a control handle having a plurality of positions about first and second axes; and
      at least one drive assembly in communication with said handle and with said reversible motors, said drive assembly adapted to convert each of said positions of said handle into first and second voltages and for applying said first voltage to one of said motors and said second voltage to the other of said motors.

5. A personal transport vehicle according to claim 4, wherein said control handle comprises a resistive joy-stick.

6. A personal transport vehicle according to claim 3, further comprising:
   a first reversible motor adapted to be powered, said first reversible motor having a drive shaft drivingly coupled to said axle of said middle wheel on said first side of said frame;
   a second reversible motor adapted to be powered, said second reversible motor having a drive shaft drivingly coupled to said axle of said middle wheel on said second side of said frame; and
   each of said axles of said middle wheels drivingly coupled to said axle of said front wheel on its respective side and to said axle of said rear wheel on its respective side.

7. A personal transport vehicle comprising:
   a frame adapted to support a person, said frame having a forward end, a rear end, and first and second spaced apart sides;
   a first set of wheels independently rotatably mounted on said first side of said frame;
   a second set of wheels independently rotatably mounted said second side of said frame;

each of said first and second sets of wheels including a center wheel, a front wheel, and a rear wheel, each of said wheels including tires mounted thereto having generally the same diameter;

each of said wheels being mounted on a respective load bearing axle, said respective load bearing axles being rotatably supported by said frame, each of said axles having an axis of rotation, said axes of rotation aligned in a common plane, whereby said tires are aligned for simultaneously engaging a support surface;

a first reversible motor adapted for connection to a power source, said first motor having a drive shaft coupled to said respective load bearing axle of said center wheel of said first set of wheels;

a second reversible motor adapted for connection to a power source, said second motor having a drive shaft coupled to said respective load bearing axle of said center wheel of said second set of wheels, said center wheel of each of said first and second wheel sets being rotatably coupled to said front wheel and said rear wheel in said respective wheel set; and an electrical control system comprising:
 a pivotal handle having a plurality of positions about first and second axes; and
 at least one drive circuit in communication with said handle and with said reversible motors, said drive circuit adapted to convert each of said positions of said handle into first and second voltages and to apply said first and second voltages to said first and second motors, respectively.

8. A personal transport vehicle according to claim 7, wherein said drive assembly includes:

a first drive assembly coupled to said pivotal handle and to said first reversible motor, said first drive assembly adapted to convert each of said positions of said pivotal handle into a first voltage and to apply said first voltage to said first motor; and a second drive assembly coupled to said pivotal handle and to said second reversible motor, said second drive assembly adapted to convert each of said positions of said pivotal handle into a second voltage and to apply said second voltage to said second motor.

9. A personal transport vehicle according to claim 8, wherein said pivotal handle comprises a joy-stick.

10. A personal transport vehicle according to claim 8, wherein said axles of said first wheel set are mounted on said first side of said frame, said axles of said second wheel set mounted on said second side of said frame, each axle of said center wheels including three sprockets, a first of said three sprockets on said axle of said center wheel on said first side of said frame coupled to said first motor shaft, a second of said sprockets on said axle of said center wheel on said first side of said frame coupled to said axle of said front wheel on said first side of said frame, a third of said sprockets on said axle of said center wheel on said first side coupled to said axle of said rear wheel on said first side, a first of said sprockets on said axle of said center wheel on said second side coupled to said second motor shaft, a second of said sprockets on said axle of said center wheel on said second side coupled to said axle of said front wheel on said second side, and a third of said sprockets on said axle of said center wheel on said second side coupled to said axle of said rear wheel on said second side.

11. A personal transport vehicle according to claim 10, wherein said sprockets are coupled to said respective motor shafts and axles by chain linkages.

12. A personal transport vehicle according to claim 8, wherein said frame includes a seat for supporting the person.

13. A personal transport vehicle according to claim 7, wherein each of said tires generates a coefficient of friction with the support surface, said tires of said center wheels generating a higher coefficient of friction with the support surface than said tires of said front and rear wheels whereby the maneuverability of said personal transport vehicle is improved.

14. A personal transport vehicle according to claim 7, wherein said tires of each of said wheels have a stiffness, said tires of said center wheels having a greater stiffness than said tires of said front and rear wheels whereby said tires of said center wheels generate a higher coefficient of friction with the support surface than said tires of said front and rear wheels whereby the maneuverability of said personal transport vehicle is improved.

15. A personal transport vehicle comprising:

a frame adapted to support a person, said frame having a forward end, a rear end, and first and second spaced apart sides:

a first set of wheels independently rotatable mounted on said first side of said frame;

a second set of wheels independently rotatably mounted said second side of said frame;

each of said first and second sets of wheels including a center wheel, a front wheel, and a rear wheel, each of said wheels including tires mounted thereto having generally the same diameter;

each of said wheels adapted to be driven about an axis of rotation, said axes of rotation aligned in a common plane, whereby said tires are aligned for simultaneously engaging a support surface, each of said tires of said center wheels having a first tire pressure, and said tires of said front and back wheels having tire pressures which are less than said first tire pressures;

a first reversible motor adapted for connection to a power source, said first motor having a drive shaft coupled to said center wheel of said first set of wheels;

a second reversible motor adapted for connection to a power source, said second motor having a drive shaft coupled to said center wheel of said second set of wheels, said center wheel of each of said first and second wheel sets being rotatably coupled to said front wheel and said rear wheel in said respective wheel set;

an electrical control system comprising:
 a pivotal handle having a plurality of positions about first and second axes; and
 at least one drive circuit in communication with said handle and with said reversible motors, said drive circuit adapted to convert each of said positions of said handle into first and second voltages and to apply said first and second voltages to said first and second motors, respectively;

a first drive assembly coupled to said pivotal handle and to said first reversible motor, said first drive assembly adapted to convert each of said positions of said pivotal handle into a first voltage and to apply said first voltage to said first motor; and a second drive assembly coupled to said pivotal handle and to said second reversible motor, said second drive assembly adapted to convert each of said positions of said pivotal handle into a second voltage and to apply said second voltage to said second motor.

16. A personal transport vehicle according to claim 10, said first tire pressure being in the range of approximately 2.5 to 3.5 times greater than said tire pressures of said tires of said front and back wheels.

17. A personal transport vehicle comprising:
a frame adapted for supporting a person, said frame having a front end, a back end, and first and second opposed sides;
two sets of axles, each of said sets of axles including three equidistantly spaced axles extending from said opposed sides of said frame, each of said axles adapted to be driven about an axis of rotation, said axles aligned in a common plane;
a ground engaging pressurized tire mounted on each of said axles, said tires having generally the same diameter for simultaneously engaging a support surface;
a first reversible motor adapted for connecting to a power supply, said first motor having a drive shaft drivingly coupled to a center axle of said three axles extending from said first side of said frame;
a second reversible motor adapted to be powered, said second motor having a drive shaft drivingly coupled to a center axle of said three axles extending from said second side of said frame; and
each of said center axles respectively drivingly coupled with a front axle of said three axles extending from a respective side of said frame and with a back axle of said three axles extending from said respective side of said frame, such that when said motors are powered to operate in the same direction all tires are simultaneously driven forward and when one of said motors is operated in an opposite direction from the other of said motors, tires on one set of axles are simultaneously driven forward while the tires on the other set of axles are simultaneously driven backwards, thus turning the transport vehicle about said tires on said center axles, and wherein each of said tires mounted to said center axles has a greater stiffness than said tires of said front and back axles to improve maneuverability of said personal transport vehicle.

18. A personal transport vehicle according to claim 17, further including a control system to selectively power said motors, said control system having a dual-axis handle.

19. A personal transport vehicle according to claim 17, wherein said frame includes a seat for supporting the person.

20. A personal transport vehicle according to claim 19, wherein said seat is centered over said center axles.

21. A personal transport vehicle comprising:
a frame adapted for supporting a person, said frame having a front end, a back end, and first and second opposed sides;
two sets of axles, each of said sets of axles including three equidistantly spaced axles extending from said opposed sides of said frame, each of said axles adapted to be driven about an axis of rotation, said axles aligned in a common plane;
a ground engaging pressurized tire mounted on each of said axles, said tires having generally the same diameter for simultaneously engaging a support surface, said tires of said center axles having a first tire pressure and said tires of said front and back axles generally having tire pressures which are less than said first tire pressure;
a first reversible motor adapted for connecting to a power supply, said first motor having a drive shaft drivingly coupled to a center axle of said three axles extending from said first side of said frame;
a second reversible motor adapted to be powered said second motor having a drive shaft drivingly coupled to a center axle of said three axles extending from said second side of said frame; and
each of said center axles respectively drivingly coupled with a front axle of said three axles extending from a respective side of said frame and with a back axle of said three axles extending from said respective side of said frame such that when said motors are powered to operate in the same direction all tires are simultaneously driven forward and when one of said motors is operated in an opposite direction from the other of said motors, tires on one set of axles are simultaneously driven forward while the tires on the other set of axles are simultaneously driven backwards, thus turning the transport vehicle on said tires about said tires on said center axles.

22. A personal transport vehicle according to claim 21, wherein each of said center axles include three sprockets, a first of said three sprockets on said center axle on said first side of said frame rotatably coupling to said drive shaft of said first motor, a second of said sprockets on said center axle on said first side of said frame rotatably coupling to said front axle on said first side of said frame, a third of said sprockets on said center axle on said first side rotatably coupling to said back axle on said first side, a first of said sprockets on said center axle on said second side rotatably coupling to said drive shaft of said second motor, a second of said sprockets on said center axle on said second side rotatably coupling to said front axle on said second side, and a third of said sprockets on said center axle on said second side rotatably coupling to said back axle on said second side.

23. A personal transport vehicle comprising:
a frame having a front end, a back end, and first and second opposed sides, said sides defining a compartment extending therebetween;
a first load bearing drive center axle rotatable mounted on said first side;
a first load bearing drive back axle rotatably mounted on said first side;
a first load bearing drive front axle rotatable mounted on said first side;
a second load bearing drive center axle rotatable mounted on said second side;
a second load bearing drive back axle rotatably mounted on said second side;
a second load bearing drive front axle rotatable mounted on said second side;
each of said first axles equidistantly spaced along said first side;
each of said second axles equidistantly spaced along said second side, all of said axles aligned in a common plane and having proximate end portions extending into said compartment through the respective sides of said frame;
a pneumatic tire mounted on distal end portions of each of said axles, said tires having substantially the same diameter for simultaneously engaging a ground surface;
a first reversible motor having a drive shaft with a first drive sprocket, said first drive sprocket coupled to said proximate end portion of said first center axle;
a second reversible motor having a drive shaft with a second drive sprocket, said second drive sprocket coupled to said proximate end portion of said second center axle;
said proximate end portions of said first and second center axles respectively coupled for rotation to said proximate end portions of said first and second front axles and to said proximate end portions of said first and second back axles; and a control system for selectively powering each of said reversible motors.

24. A personal transport vehicle according to claim 23, wherein said control system includes a joy-stick handle.

25. A personal transport vehicle comprising:

a frame having a front end, a back end, and first and second opposed sides, said sides defining a compartment extending therebetween;

a first center axle mounted on said first side;

a first back axle mounted on said first side;

a first front axle mounted on said first side;

a second center axle mounted on said second side;

a second back axle mounted on said second side;

a second front axle mounted on said second side;

each of said first axles equidistantly spaced along said first side;

each of said second axles equidistantly spaced along said second side all of said axles aligned in a common plane and having proximate end portions extending into said compartment through the respective sides of said frame;

a pneumatic tire mounted on distal end portions of each of said axles, said tires having substantially the same diameter for simultaneously engaging a ground surface, each of said tires of said center axles having a first tire pressure and said tires of said front and back axles generally having tire pressures which are less than said first tire pressures, wherein said first tire pressures are in the range of approximately 2 to 4 times greater than said tire pressures of said tires of said front and back axles;

a first reversible motor having a drive shaft with a first drive sprocket, said first drive sprocket coupled to said proximate end portion of said first center axle;

a second reversible motor having a drive shaft with a second drive sprocket, said second drive sprocket coupled to said proximate end portion of said second center axle;

said proximate end portions of said first and second center axles respectively coupled for rotation to said proximate end portions of said first and second front axles and to said proximate end portions of said first and second back axles; and a control system for selectively powering each of said reversible motors.

26. A method of improving the maneuverability of a six wheel drive vehicle, the method comprising the steps of:

providing a six wheel drive vehicle having a pair of front tires, a pair of middle tires, and a pair of rear tires;

providing each of the front tires with a pressure;

providing each of the rear tires with a pressure; and providing each of the middle tires with a pressure greater than any of the tire pressures of the front and rear tires, such that the weight of the vehicle is distributed with greater proportion to the middle tires and, consequently, reduces the friction between the front and rear tires and a support surface to improve the turning ability and general maneuverability of the vehicle.

27. The method of claim 26 wherein three of said tires are rotatably mounted in line with one another on each side of the vehicle, the vehicle including a drive assembly for driving said three in-line tires on one side in unison with one another and said three in-line tires on the other side in unison with one another, said method including providing the pressure in each of the middle tires in the range of two to four times greater than the pressures in the front and rear tires.

* * * * *

UNITED STATES PATENT AND TRADEMARK OFFICE
CERTIFICATE OF CORRECTION

PATENT NO. : 5,842,532
DATED      : December 1, 1998
INVENTOR(S): Bruce W. Fox, et al It is certified that error appears in the above-identified patent and that said Letters Patent is hereby corrected as shown below:

Column 12, Claim 15, line 22:

Please delete "rotatable" and insert in lieu thereof --rotatably--.

Column 12, Claim 16, line 66:

Please delete "10" and insert in lieu thereof --15--.

Column 14, Claim 23, lines 35, 39, 41, and 45:

Please delete "rotatable" and insert in lieu thereof --rotatably--.

Signed and Sealed this

Twentieth Day of June, 2000

*Attest:*

Q. TODD DICKINSON

*Attesting Officer*      *Director of Patents and Trademarks*